Oct. 30, 1962   R. L. SMIRL   3,061,062
CLUTCH
Filed Nov. 2, 1959   2 Sheets-Sheet 1

Inventor:
Richard L. Smirl
By: Francis T. Drumm
Atty.

Oct. 30, 1962  R. L. SMIRL  3,061,062
CLUTCH
Filed Nov. 2, 1959  2 Sheets-Sheet 2

Inventor:
Richard L. Smirl
By: Francis T. Drumm
Atty.

United States Patent Office 3,061,062
Patented Oct. 30, 1962

3,061,062
CLUTCH
Richard L. Smirl, La Grange Park, Ill., assignor to Borg-Warner Corporation, Chicago, Ill., a corporation of Illinois
Filed Nov. 2, 1959, Ser. No. 850,424
5 Claims. (Cl. 192—69)

This invention relates to clutches and more particularly to clutches of the multiple plate type.

Heretofore, difficulty has been experienced in clutches of the type having two or more pressure plates of retracting the intermediate pressure plate or plates from the intermediate driven plate or plates when the clutch is disengaged.

To achieve minimum separation between pressure and driven plates of a clutch assembly, thereby being commensurate with the aims of space saving, individual pressure plates must travel different axial distances during the disengaging movement. Thus, any retracting means which is used to accomplish such movement must accommodate such differential movement while at the same time have a construction which is economical and is of the utmost simplicity.

It is, therefore, a primary object of this invention to provide an improved clutch assembly of the multiple pressure plate type, wherein durable, simple, and economical retraction means are provided which assure separation of the pressure and driven plates upon disengagement of the clutch.

Another object of this invention is to provide a clutch assembly of the multiple plate type wherein strap means are incorporated which not only serve to provide a driving connection between the flywheel and the pressure plates which isolate vibrational characteristics, but also to serve as a retraction means for disengaging intermediate pressure plates of such a clutch assembly upon positive movement of one of the pressure plates.

Still another object of this invention is to provide a clutch assembly of a multiple plate type wherein a plurality of resilient strap means interconnect the flywheel and a series of pressure plates so that upon positive axial disengagement of the outermost pressure plate, the intermediate pressure plate or plates will be caused to move a predetermined ratio thereof to completely disengage the clutch assembly.

Yet still another object of this invention is to provide a clutch assembly in accordance with the preceding objects in which the strap means automatically accommodate wear which takes place between the driven and pressure plates of the clutch assembly.

Figure 1:
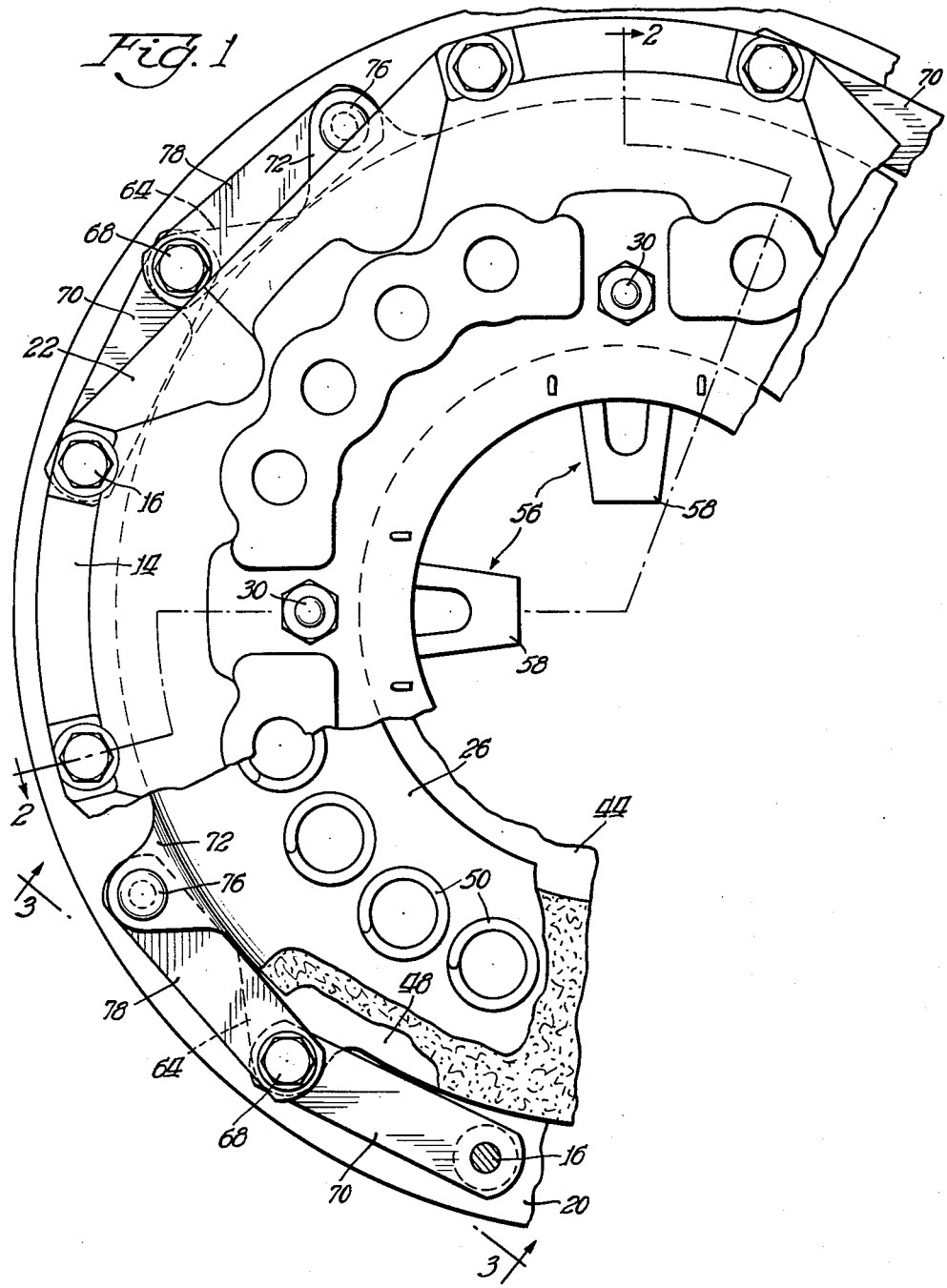
FIGURE 1 is an elevational view, partly in section and partly broken away, of a clutch assembly made in accordance with the present invention.
Figure 2:
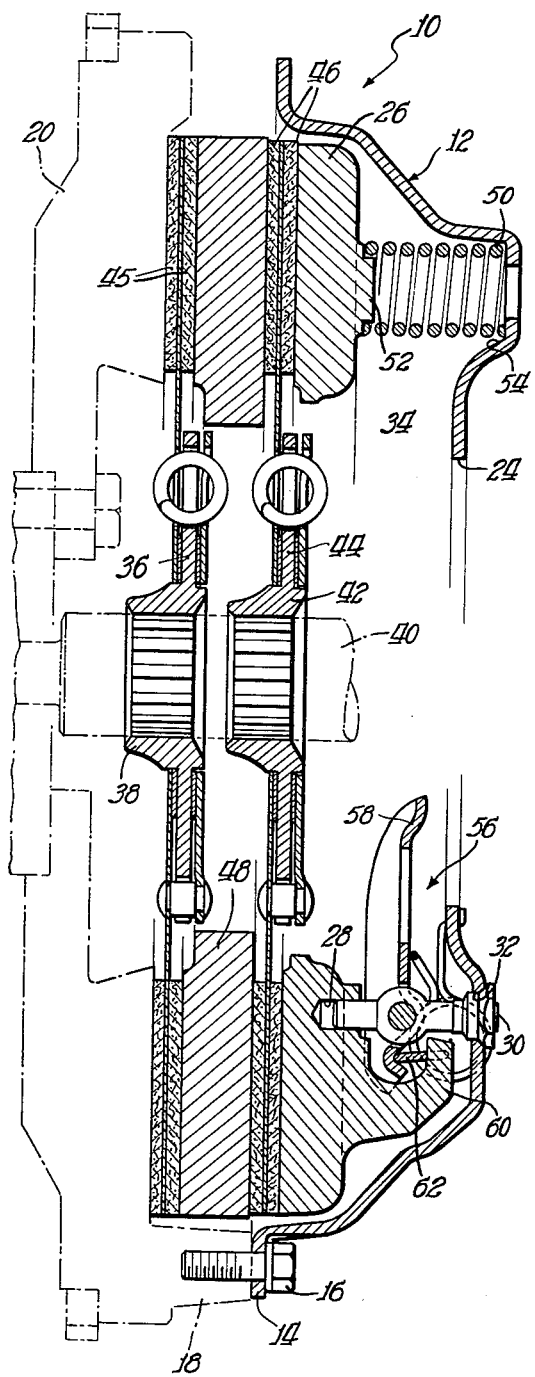
FIGURE 2 is an elevational sectional view taken substantially along line 2—2 of FIGURE 1.
Figure 3:
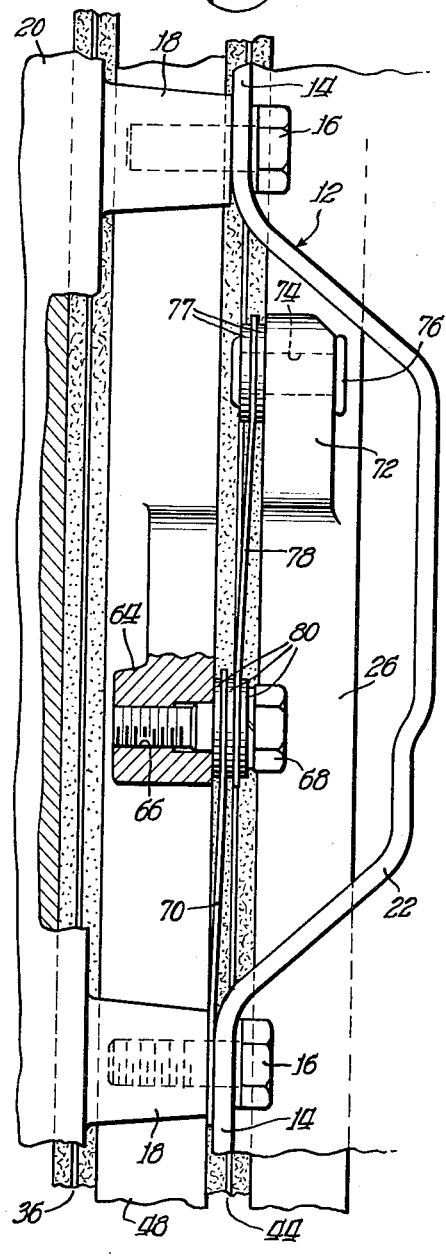
FIGURE 3 is an enlarged fragmentary sectional view taken substantially along line 3—3 of FIGURE 1.

Referring to the drawings, and more particularly to FIGURES 1 and 2, the clutch assembly of the present invention is indicated generally by reference numeral 10 and comprises a cover plate 12 having co-planar flange sections 14 which are illustrated as being secured by means of circumferentially spaced cap screws 16 to a plurality of circumferentially spaced bosses 18. The bosses 18 are integrally formed with a flywheel 20 and extend axially from the outer marginal edge of one side thereof. Arranged between the several flanged sections 14 are raised chordal sections 22 (FIG. 3) for a purpose hereafter described.

The cover plate 12, as shown best in FIGURE 2, is of concave cross section and has a central opening 24 for sliding reception of a conventional release bearing adapted to engage lever 58 (not shown). The flywheel 20 is of the so-called "pot" construction and cooperates with a cover plate 12 in forming a chamber 34. Between the cover plate 12 and the flywheel 20, being within the chamber 34 and the pot of the flywheel, is a plurality of pressure plates and driven plates, among which is an outermost pressure plate 26 having a plurality of bores 28 facing the cover plate and in each of which is slidably received one end of an eye bolt 30 passing through one of registering openings 32 in the cover plate 12. The eye bolts 30, being snugly fitted within the bores 28 and the openings 32, and being circumferentially spaced about the cover plate, provide one of two means by which the outermost pressure plate 26 is driven to transmit drive from the driven flywheel 20.

Also within the chamber 34 is mounted a driven plate 36 which has hub 38 splined to an output shaft 40 (illustrated in dot and dash lines). Also splined to the output shaft 40 is a hub 42 of a driven plate 44. Affixed to the outer marginal edge of the driven plate 36 are annular friction facings 45, and similarly, annular friction facings 46 are secured to the outer marginal edges of the driven plate 44.

Interposed between the driven plate 36 and the driven plate 44 is a secondary or intermediate pressure plate 48. The driven plates 36 and 44 are frictionally and drivingly clamped between the flywheel 20 and the plurality of pressure plates 26 and 48 by a clutch engaging force applied to the outermost pressure plate 26 so that said elements move against the flywheel and against each other. The outermost pressure plate 26 is biased to the engaged position illustrated in FIGURE 2 by means of a plurality of circumferentially spaced helical springs 50 each of which is maintained in the position illustrated in FIGURE 2 by means of a boss 52 formed integrally with the pressure plate 26 and a hollow boss 54 formed in the cover plate 12.

The driven plates 36 and 44 may be selectively disengaged by means of a plurality of circumferentially spaced release assemblies 56. Each release assembly 56 includes a release lever 58 which is mounted for pivotal movement about one of the eye bolts 30. The main or outermost pressure plate 26 is provided adjacent each of the bores 28 with a ledge portion 60 against which abuts a strut 62 which is engaged by the lower end of the lever 58 upon movement of the release bearing assembly to the left, as viewed in FIGURE 2, for movement of the pressure plate 26 to the right against the force of the springs 50. As the pressure plate 26 moves to the right, the driven plate 44 is disengaged.

According to the present invention, means are provided for assuring release of the driven plate 36 upon disengagement of the pressure plate 26. This means involves the interconnection of the plurality of pressure plates with the flywheel in consecutive series so that upon axial movement of the outermost pressure plate, the intermediate pressure plate or plates will be caused to move a predetermined ratio of the distance traversed by the outermost pressure plate and thereby provide a minimum and preselected separation distance. To this end, the secondary pressure plate 48 is provided at its outer periphery with a plurality of circumferentially spaced integrally formed lugs 64 each of which is provided with a bore 66 for threaded reception of a cap screw 68. Extending between each boss 64 and each boss 18 of a flywheel 20 is a strap 70, each one of which is apertured at one end for reception of a cap screw 16 and at the other end for reception of a cap screw 68.

The main pressure plate 26 is provided at its outer periphery with a plurality of circumferentially spaced radially outwardly extending lugs 72 each one of which is formed with an axially extending bore 74 in which is received at rivet 76. A strap 78 extends between each lug 72 and each plug 64; each of the straps 78 being apertured at one end for reception of the rivet 76 and at the other end for reception of cap screw 68. Spacer collars 77 surround one end of the rivet 76, one on each side of the strap 78. Similarly, spacing collars 80 are arranged in surrounding relation to each cap screw 68 to maintain a predetermined spaced relation between the adjacent ends of the strap 70 and the straps 78.

For purposes of the preferred embodiment, the axial disengaging movement of the intermediate pressure plate 48 should be one-half the distance traversed by pressure plate 26. To insure this ratio of movement, the straps 78 and 70 are of generally equal resiliency and of the same general configuration. The operation of the interconnecting strap members may then be visualized by considering them as equivalent to a resilient rubber band fixedly connected to the flywheel. Upon stretching of the outermost end of such band, members attached to intermediate portions of the band will be caused to move a proportional distance as that of the end of the band as it is stretched.

The clutch of the above described invention exhibits important advantages over two-plate clutches of the type heretofore known. For instance, the secondary pressure plate 48 is mounted in operative position by means of the straps 70 and, these straps transmit torque to the secondary pressure plate. Furthermore, separation of the secondary pressure plate 48 from the driven plate 36 is assured by the action of straps 78. The plurality of straps 78 and 70 are attached to the bosses on the flywheel and pressure plate so that they are chordally disposed to a circumference of the pressure plates and thereby torque is transmitted through them in a direction aligned with their greatest extent. Such chordal disposition insures greater durability of the strap since their greatest mass resists fatigue and stress. By the arrangement above described, the movement of the secondary pressure plate 48 imparted by the straps 78 upon release of the pressure plate 26 always amounts to one-half of the total axial extent of movement of the pressure plate 26. It will be appreciated that this predetermined movement not only assures retraction of the pressure plate 48 from the driven plate 36 but also assures separation of the secondary pressure plate 48 from the driven plate 44. As wear occurs on the friction facings 44 and 46 the extent of movement of the secondary pressure plate 48 in response to movement of the pressure plate 26 against the force of the springs 50 always is half of the total extent of movement of the main pressure plate.

While I have described my invention in connection with specific constructions and arrangements, it is to be understood that this is by way of illustration and not by way of limitation and the scope of my invention is defined solely by the appended claims which should be construed as broadly as the prior art will permit.

I claim:

1. A clutch mechanism, comprising: drive and driven members; a plurality of annular and axially movable pressure plates in general alignment with each other about one of said members; reaction means drivingly connected to said drive member and being secured against axial movement, said reaction means having an annular reaction surface in alignment with said pressure plate and spaced to one side of said plurality of pressure plates to form therewith a series of clamping elements; a plurality of annular driven plates having one each separating adjacent elements of said series of clamping elements and adapted to be frictionally clamped therebetween, said driven plates being drivingly connected to said driven member and adapted for sliding movement thereon; resilient means drivingly connecting said clamping elements in series one to the other so that upon axial movement of the outermost pressure plate, the intermediate pressure plates will be caused to move a predetermined ratio of the distance traversed by said outermost pressure plate; means biasing said clamping element and driven plates into frictional engagement for transmission of torque between said drive and driven members; and means connected to said outermost pressure plate for applying a disengaging force whereby said outermost pressure plate is caused to move axially with said intermediate pressure plate moving said ratio thereof.

2. A clutch mechanism as in claim 1, in which said resilient means comprises a plurality of elongate straps, each strap having each opposite ends fixedly connected to one of adjacent clamping elements, said straps being of generally equal resiliency and configuration so that upon axial movement of said outermost pressure plate, the intermediate pressure plates will be caused to move a ratio of the movement of the outermost plate, said ratio being provided by the following: the number of pressure plates separating the pressure plate in question plus 1 divided by the total number of pressure plates.

3. A clutch mechanism as in claim 1, in which said clamping elements each have bosses thereon extending outwardly of the outer periphery of said pressure plates, said bosses on each clamping element being equally spaced circumferentially thereabout, and said resilient means comprising a plurality of elongated straps, each strap having each opposite ends fixedly connected to one boss of adjacent clamping elements, said strap being chordally disposed relative to a circumference of each pressure plate so that torque may be transmitted to said pressure plate in the direction of the greatest extent of each strap to promote the life of said straps.

4. A clutch mechanism as in claim 1, in which straps interconnecting clamping elements located on opposite sides of any one element are fastened to a common location on said one element.

5. A clutch mechanism, comprising: drive and driven members; a pair of annular and axially movable pressure plates in general alignment with each other about one of said members; a flywheel drivingly connected to said driving member and secured against axial movement, said flywheel having an annular reaction surface in alignment with said pressure plates and spaced to one side of said pair of said pressure plates to form therewith a series of clamping elements; a pair of driven plates with one each separating adjacent elements of said series of clamping elements, said driven plates being drivingly connected to said driven member and adapted for sliding movement thereon; flexible straps drivingly connecting said clamping elements one to the other in consecutive series so that upon axial movement of the outermost pressure plate, the intermediate pressure plate will be caused to move a predetermined ratio of the distance traversed by said outermost pressure plate; means biasing said clamping elements and driven plates into frictional engagement for transmission of torque; and means connected to said outermost pressure plate for applying a disengaging force thereto.

References Cited in the file of this patent

UNITED STATES PATENTS

| | | |
|---|---|---|
| 1,944,337 | Wemp | Jan. 23, 1934 |
| 2,672,226 | Zeidler | Mar. 16, 1954 |